US012724651B2

(12) United States Patent
Scheps et al.

(10) Patent No.: US 12,724,651 B2
(45) Date of Patent: Sep. 1, 2026

(54) SYSTEMS AND METHODS FOR DISTRIBUTED QUANTUM COMPUTING

(71) Applicant: MELLANOX TECHNOLOGIES, LTD., Yokneam (IL)

(72) Inventors: Kyle Scheps, Geneva (CH); Elad Mentovich, Tel Aviv (IL); Hossein Seifoory, Toronto (CA); Dimitris Syrivelis, Volos (GR); Paraskevas Bakopoulos, Ilion (GR); Ioannis (Giannis) Patronas, Piraeus (GR)

(73) Assignee: Mellanox Technologies, Ltd., Yokneam (IL)

( * ) Notice: Subject to any disclaimer, the term of this patent is extended or adjusted under 35 U.S.C. 154(b) by 1099 days.

(21) Appl. No.: 17/660,349

(22) Filed: Apr. 22, 2022

(65) Prior Publication Data

US 2023/0315539 A1 Oct. 5, 2023

(30) Foreign Application Priority Data

Apr. 1, 2022 (GR) .............................. 20220100290

(51) Int. Cl.
*G06F 9/52* (2006.01)
*G06N 10/40* (2022.01)
*G06N 10/60* (2022.01)

(52) U.S. Cl.
CPC ............... *G06F 9/52* (2013.01); *G06N 10/40* (2022.01); *G06N 10/60* (2022.01)

(58) Field of Classification Search
None
See application file for complete search history.

(56) References Cited

U.S. PATENT DOCUMENTS 7,875,876 B1 * 1/2011 Wandzura .............. G06N 10/40 257/26
9,077,577 B1 7/2015 Ashrafi et al.
9,356,780 B2 5/2016 Tanizawa et al.
(Continued)

OTHER PUBLICATIONS

Diadamo et al.; "Distributed Quantum Computing and Network control for Accelerated VQE" IEEE 2021 (Diadamo_2021.pdf) (Year: 2021).*

(Continued)

*Primary Examiner* — Hiren P Patel
(74) *Attorney, Agent, or Firm* — Alston & Bird LLP

(57) ABSTRACT

A distributed quantum computing system is provided that performs distributed quantum computing with time synchronization. The distributed quantum computing system includes a computer processing unit configured to instruct one or more quantum processing units to perform one or more operations associated with a quantum algorithm. The one or more QPUs include a plurality of qubits and the one or more QPUs are in communication with each other via a quantum channel. Each of the plurality of qubits may include local qubits, global qubits, and/or synchronization qubits. The local qubits and global qubits of each QPU may be configured to perform the one or more operations associated with the quantum algorithm. The synchronization qubits of each QPU may be configured to determine if the one or more operations associated with the quantum algorithm performed by each of the one or more QPUs are in sync.

28 Claims, 6 Drawing Sheets

(56) References Cited

U.S. PATENT DOCUMENTS

| | | | | |
|---|---|---|---|---|
| 9,413,470 | B1 * | 8/2016 | Smith | H04B 10/70 |
| 11,451,308 | B1 | 9/2022 | Bucklew et al. | |
| 11,521,103 | B1 * | 12/2022 | Reagor | G06N 10/60 |
| 11,526,795 | B1 * | 12/2022 | McMahon | G06N 20/00 |
| 12,056,523 | B2 * | 8/2024 | Griffin | G06N 10/40 |
| 2008/0165957 | A1 | 7/2008 | Kandasamy et al. | |
| 2013/0101119 | A1 | 4/2013 | Nordholt et al. | |
| 2017/0214525 | A1 | 7/2017 | Zhao et al. | |
| 2021/0034411 | A1 * | 2/2021 | Griffin | G06N 5/025 |
| 2021/0174237 | A1 | 6/2021 | Mentovich | |
| 2021/0374584 | A1 * | 12/2021 | Coady | G06F 8/311 |
| 2021/0398008 | A1 * | 12/2021 | Griffin | G06N 10/80 |
| 2022/0006627 | A1 | 1/2022 | Ko et al. | |
| 2022/0027323 | A1 * | 1/2022 | Coady | G06N 10/00 |
| 2022/0222557 | A1 * | 7/2022 | Cruise | G06F 9/30101 |
| 2022/0308923 | A1 * | 9/2022 | Griffin | G06F 9/4881 |
| 2022/0345301 | A1 * | 10/2022 | Braithwaite | H04L 9/0819 |
| 2023/0020389 | A1 * | 1/2023 | Davis | G06F 9/5038 |
| 2023/0034075 | A1 * | 2/2023 | Griffin | G06N 10/00 |
| 2023/0088643 | A1 * | 3/2023 | Del Pino Ruiz | G06N 10/60 706/62 |
| 2023/0095267 | A1 * | 3/2023 | Coady | G06F 15/16 716/100 |
| 2023/0110591 | A1 * | 4/2023 | Routt | G06F 15/16 706/12 |
| 2023/0198634 | A1 * | 6/2023 | Orús Lacort | G06N 10/20 380/256 |
| 2023/0244973 | A1 * | 8/2023 | Naveh | G06N 10/20 706/62 |
| 2023/0385676 | A1 * | 11/2023 | Mentovich | G06N 10/60 |
| 2024/0187344 | A1 * | 6/2024 | Griffin | G06N 10/00 |

OTHER PUBLICATIONS

Parekh et al.; "Quantum Algorithms and simulation for Parallel and Distributed Quantum Computing"; 2021 IEEE/ACM; (Parekh_2021.pdf) (Year: 2021).*

Avron, Joseph (Yosi) et al., Quantum advantage and noise reduction in distributed quantum computing. Physical Review A., Aug. 23, 2021, 104. 10.1103/PhysRevA.104.052404.

Beals, Robert et al., Efficient Distributed Quantum Computing, Proceedings of the Royal Society A: Mathematical, Physical and Engineering Sciences, Feb. 20, 2013, 469, No. 2153 : 20120686-20120686.

Cochran, Roderick D. et al., Qubit-Based Clock Synchronization for QKD Systems Using a Bayesian Approach, Entropy 2021, 23, 988. https://doi.org/10.3390/e23080988.

Diadamo, Stephen et al., Distributed Quantum Computing and Network Control for Accelerated VQE, IEEE Transactions on Quantum Engineering, 2021, pp. 1-1. 10.1109/TQE.2021.3057908.

Humble, Travis et al., Quantum Computers for High-Performance Computing, IEEE Micro, 2021, 41. 15-23. 10.1109/MM.2021.3099140.

Preskill, John, Quantum Computing in the NISQ era and beyond, Quantum 2, Art. No. 79, Jul. 30, 2018, ISSN 2521-327X. doi:10.22331/q-2018-08-06-79.

Notice of Allowance issued Mar. 14, 2023, in pending U.S. Appl. No. 17/227,321.

* cited by examiner

610 TRANSMIT A FIRST INSTRUCTION TO PERFORM ONE OR MORE OPERATIONS ASSOCIATED WITH A QUANTUM ALGORITHM ON A FIRST QUANTUM PROCESSING UNIT (QPU) AND A SECOND QPU

620 TRANSMIT THE SYNCHRONIZATION QUBITS OF THE FIRST QPU TO THE SECOND QPU VIA A QUANTUM CHANNEL

630 PERFORM A QUANTUM OPERATION ON THE SYNCHRONIZATION QUBITS OF THE FIRST QPU TO GENERATE UPDATED SYNCHRONIZATION QUBITS OF THE FIRST QPU

640 TRANSMIT THE UPDATED SYNCHRONIZATION QUBITS OF THE FIRST QPU FROM THE SECOND QPU TO THE FIRST QPU VIA THE QUANTUM CHANNEL

650 DETERMINE WHETHER THE ONE OR MORE OPERATIONS ASSOCIATED WITH THE QUANTUM ALGORITHM PERFORMED BY THE FIRST QPU AND THE ONE OR MORE OPERATIONS ASSOCIATED WITH THE QUANTUM ALGORITHM PERFORMED BY THE SECOND QPU ARE IN SYNC BASED ON THE UPDATED SYNCHRONIZATION QUBITS OF THE FIRST QPU

660 RECEIVE DATA GENERATED BY THE ONE OR MORE OPERATIONS ASSOCIATED WITH THE QUANTUM ALGORITHM PERFORMED BY THE FIRST QPU AND THE SECOND QPU

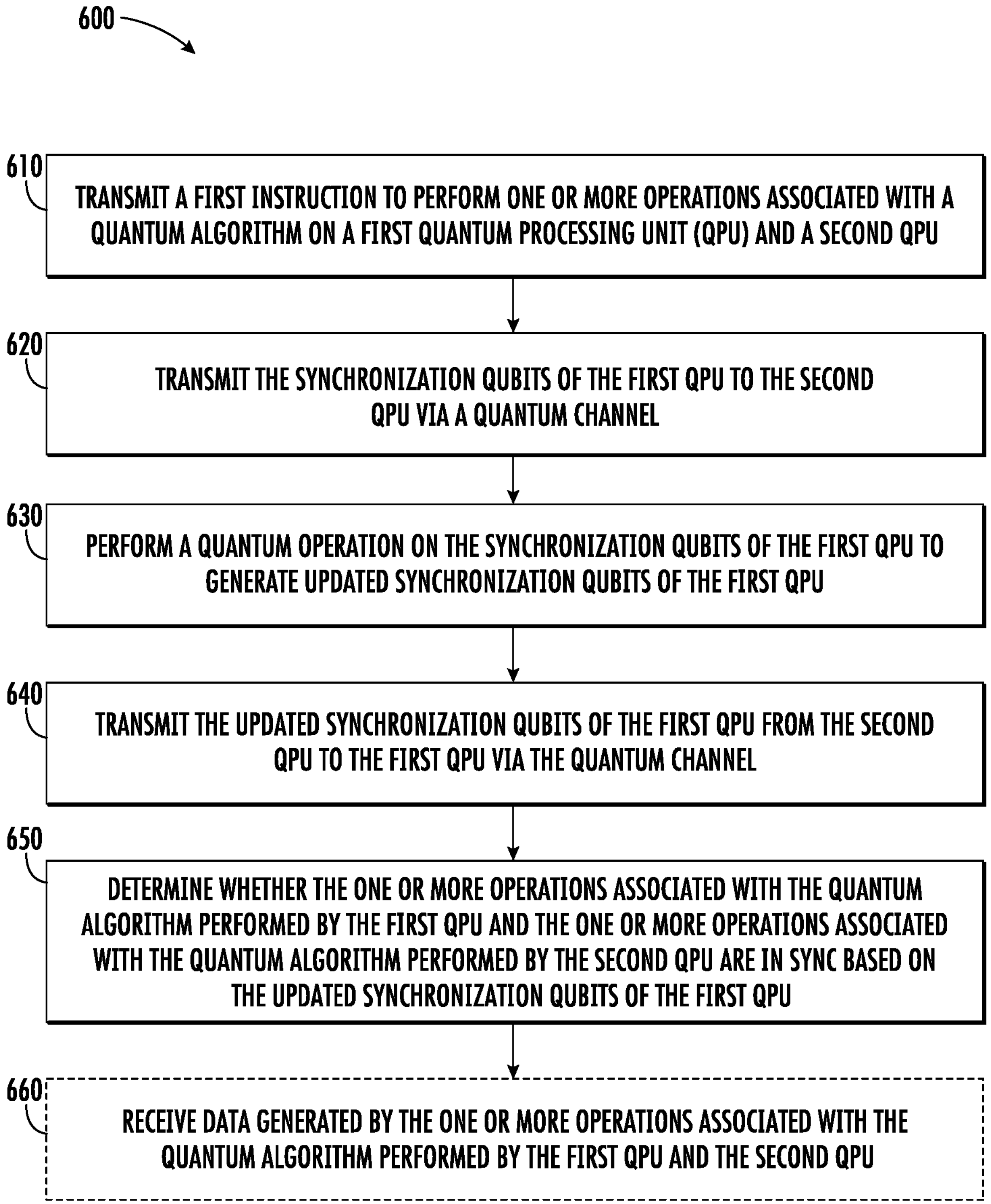

FIG. 6

SYSTEMS AND METHODS FOR DISTRIBUTED QUANTUM COMPUTING

CROSS-REFERENCE TO RELATED APPLICATIONS

This application claims priority to Greek Patent Application No. 20220100290, filed Apr. 1, 2022, the content of which is hereby incorporated by reference herein in its entirety.

TECHNOLOGICAL FIELD

Example embodiments of the present disclosure relate generally to quantum computing and, more particularly, to distributed quantum computing applications.

BACKGROUND

Quantum computing applications leverage the laws of quantum mechanisms (e.g., superposition, entanglement, etc.) to complete or otherwise solve certain computational problems exponentially faster than the capabilities of classical computers. Applicant has identified a number of deficiencies and problems associated with quantum computing, particularly when applied to distributed computing environments. Through applied effort, ingenuity, and innovation, many of these identified problems have been solved by developing solutions that are included in embodiments of the present disclosure, many examples of which are described in detail herein.

BRIEF SUMMARY

Systems, apparatuses, and methods are disclosed herein for distributed quantum computing. An example apparatus of the present disclosure may include a first quantum processing unit (QPU) configured to perform one or more operations associated with a quantum algorithm. The first QPU may include a first plurality of qubits and at least a portion of the first plurality of qubits may be synchronization qubits configured to determine if the one or more operations performed by the first QPU associated with the quantum algorithm are in sync.

In some embodiments, at least a portion of the first plurality of qubits are local qubits configured to perform the one or more operations associated with the quantum algorithm on the first QPU.

In some further embodiments, the synchronization qubits may be independent of the local qubits performing the one or more operations associated with the quantum algorithm.

In some embodiments, the apparatus may further include a second QPU in communication with the first QPU via a quantum channel and configured to perform the one or more operations associated with the quantum algorithm. The second QPU may include a second plurality of qubits and at least a portion of the second plurality of qubits are synchronization qubits configured to determine if the one or more operations performed by the second QPU associated with the quantum algorithm are in sync.

In some further embodiments, the synchronization qubits of the first QPU and the synchronization qubits of the second QPU may be further configured to determine if the one or more operations associated with the quantum algorithm performed by the first QPU and the second QPU are in sync.

In some still further embodiments, determining if the one or more operations associated with the quantum algorithm are in sync may further include transmitting the synchronization qubits of the first QPU to the second QPU via a quantum channel, performing a quantum operation on the synchronization qubits of the first QPU to generate updated synchronization qubits of the first QPU, transmitting the updated synchronization qubits of the first QPU from the second QPU to the first QPU via the quantum channel, and determining whether the one or more operations associated with the quantum algorithm performed by the first QPU and the one or more operations associated with the quantum algorithm performed by the second QPU are in sync based on the updated synchronization qubits of the first QPU.

In some embodiments, the first QPU and the second QPU operate may be parallel so as to perform the one or more operations associated with the quantum algorithm.

In some further embodiments, at least a portion of the first plurality of qubits of the first QPU include global qubits and at least a portion of the second plurality of qubits of the second QPU include global qubits. The global qubits of the first QPU may be configured to perform the one or more operations associated with the quantum algorithm in conjunction with the global qubits of the second QPU.

In some embodiments, the apparatus may further include a computer processing device in communication with the first QPU and the second QPU. The computer processing device may be configured to receive data generated by the one or more operations associated with the quantum algorithm performed by the first QPU and the second QPU.

In some further embodiments, the global qubits of the first QPU and the global qubits of the second QPU may be entangled.

Although configured for use with any number of quantum algorithms, in some embodiments, the quantum algorithm may be a Variational Quantum Eigensolver.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

FIG. 6 illustrates a flowchart of an example method for performing distributed quantum computing in accordance with one or more embodiments of the present disclosure.

DETAILED DESCRIPTION

Overview

Figure 1:
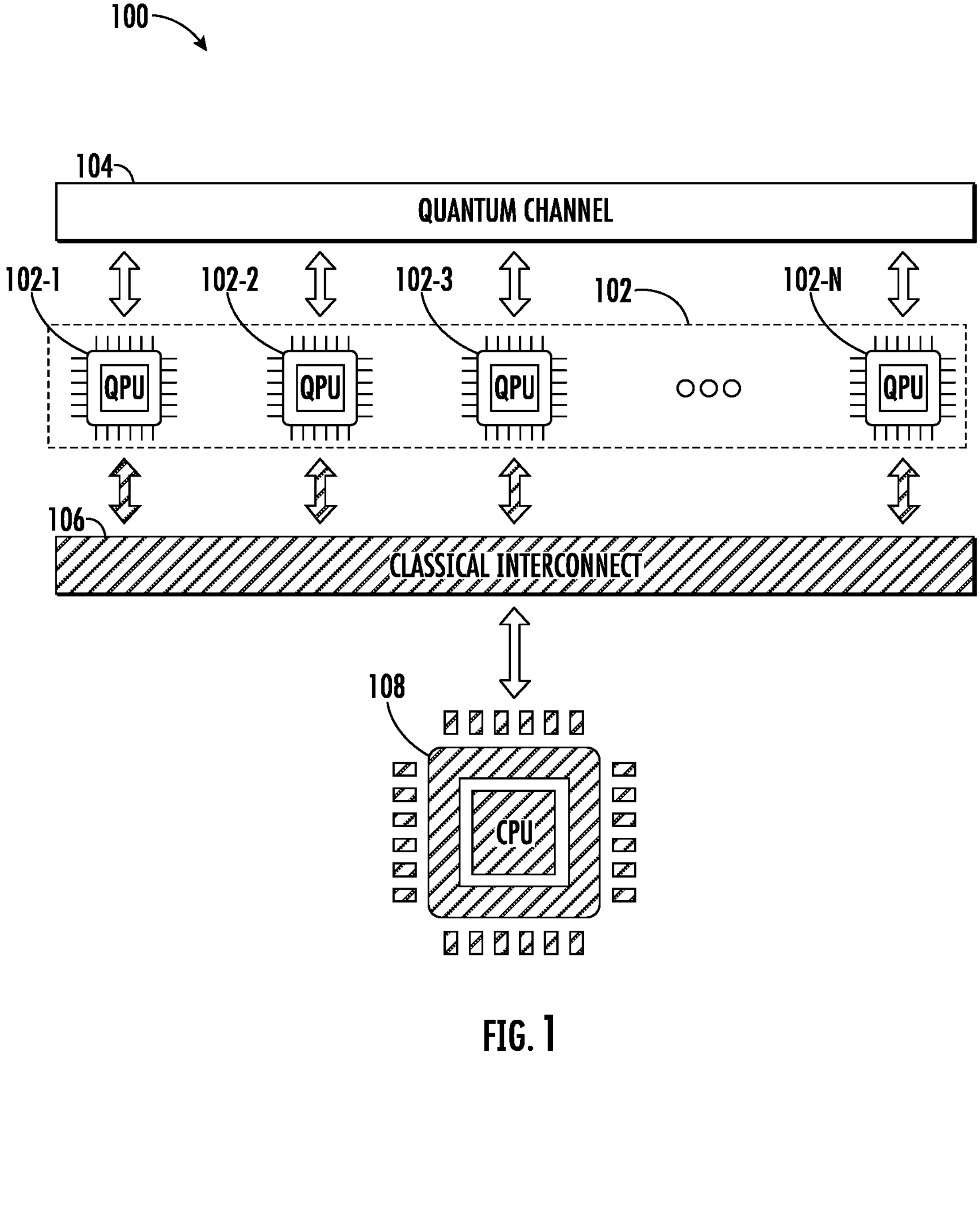
FIG. 1 illustrates an example distributed quantum computing system in accordance with one or more embodiments of the present disclosure.

Quantum computers are a new type of computer that leverage the laws of quantum mechanics, such as superposition and entanglement, to solve certain computing problems exponentially faster than classical computers (e.g., transistor based computers). In a quantum computer, the basic units of information are quantum bits (qubits), which are the quantum analog of binary bits in a classical computer. In general, the processing power of a quantum computer may be increased by increasing the number of qubits on the quantum computer. The complexities of quantum mechanics, however, have severely limited the number of qubits that may be placed on current quantum computers without compromising the functioning of the quantum computer, thus, limiting the processing power of current quantum computers. For example, in current quantum computers increasing the number of qubits may cause a corresponding increase in the output noise of the quantum computer. As the output noise of the quantum computer increases, the solution generated by the quantum computer may become difficult to ascertain in light of the associated noise. Accordingly, in order for quantum computers to reach their full potential, solutions are needed to overcome the qubit limitation of quantum computers imposed by the complexities of quantum mechanics.

One attempt at overcoming the qubit limitation of quantum computers is to create a distributed quantum computing system that includes multiple separate quantum computers that are each classically connected (e.g., via a computer bus or equivalent classical method for connectivity) to a classical computer. In such a distributed quantum computing system, the system as a whole may have a greater number of qubits, and corresponding processing power, than a single quantum computer. Since such a distributed system has access to qubits from multiple quantum computers, the noise generated by any particular quantum computer may be practically limited so as to prevent any detrimental impact of such noise on the operations of these quantum computers. Moreover, distributed quantum computing may provide substantial noise reduction due to the shallower depth associated with these systems. The distributed quantum computing system may be able to avoid the challenges faced by single quantum computers. Combining multiple quantum computers into a distributed quantum computing system and implementing a quantum algorithm on such a system has presented new challenges not anticipated by conventional quantum computing implementations.

For example, a quantum algorithm may be divided into several components by a classical computer for providing individually to each of the quantum computers in the distributed quantum computing system. Once each quantum computer of the distributed quantum computing system has completed its assigned component of the quantum algorithm, the data generated by each quantum computer may be transmitted back to the classical computer which may combine the data generated by each quantum computer into a solution to the quantum algorithm. These conventional divisional techniques, however, often result in several system limitations. By way of continued example, some quantum algorithms may not be capable of being divided into equal components such that the quantum computers in the distributed quantum computing system may finish their assigned component of the quantum algorithm at different times. As a result, some quantum computers may sit idle until each quantum computer has completed its portion of the quantum algorithm, thus, underutilizing the resources of the distributed quantum computing system.

Additionally, some quantum algorithms may only be able to be divided into components that are too large for a single quantum computer to complete (e.g., a component of a quantum algorithm may require 20 qubits, but each quantum computer in the distributed quantum computing system may only have 10 qubits). Thus, these conventional attempts at providing a distributed quantum computing system may be incapable of solving certain quantum algorithms. Furthermore, given that each quantum computer in the distributed quantum computing system is performing only a component of the quantum algorithm, the data generated by each quantum computer must be combined by the classical computer into a final or complete solution. As a result, additional communication between the quantum computers and the classical computer as well as additional processing by the classical computer are necessary resulting in increased latency, which becomes increasingly problematic if the distributed quantum computing system is integrated into a larger computer network.

In other implementations of a quantum algorithm on a distributed quantum computing system, the quantum computers in the distributed quantum computing system may work together in a sequential manner to solve an example quantum algorithm. In such a conventional approach, a Local Operations and Classical Communication ("LOCC") Entangle model may be used in which pre-entangled qubits are generated for multiple quantum computers in the distributed quantum computing system. The distributed quantum computing system may begin solving the quantum algorithm by performing an operation associated with the quantum algorithm on a first quantum computer, the data generated by this operation may then be communicated to a second quantum computer via a classical communication link (e.g., a computer bus). The second quantum computer may then perform another operation based on the data received from the first quantum computer. This process may continue until a final or complete solution to the quantum algorithm is generated, and the final solution may then be transmitted to the classical computer of the distributed quantum computing system.

Although potentially capable of leveraging the qubits of multiple quantum computers in the distributed quantum computing system to solve a quantum algorithm, these conventional systems are also subject to various limitations. For example, the sequential nature of solving the quantum algorithm (e.g., an operation is performed at a first quantum computer and then another operation is performed at a second quantum computer based on the data generated from the first operation) results in some quantum computers remaining idle due to their dependency upon the operations of other quantum computers, thus, underutilizing the resources of the distributed quantum computing system. As another example, the regular communication between the quantum computers of the distributed quantum computing system via a classical communication link (e.g., requiring repeated movement from the qubit level to the field programmable gate array ("FPGA") level) adds substantial latency, which may hamper the performance and practicality of the distributed quantum computing system. In order to account for the sequential nature of this conventional approach and the latency introduced by the classical communication between the quantum computers, the classical computer must generate a precise and predetermined (e.g., set before the distributed quantum computing system begins solving the quantum algorithm) schedule that instructs each quantum computer in the distributed quantum computing system when to activate. Due to the unpredictable nature of how long it may take one quantum computer to perform a particular operation associated with a quantum algorithm and the variability in the latency introduced through the classical communication link, it is difficult to generate an accurate schedule. If the schedule is inaccurate, quantum computers in the distributed quantum computing system may activate at an incorrect time resulting in delays and/or failures.

Thus, to address these and/or other issues related to distributed quantum computing systems and implementing quantum algorithms on distributed quantum computing systems, systems, apparatuses, and/or methods for distributed quantum computing with time synchronization are provided herein. For instance, in various embodiments, a distributed quantum computing system is provided that includes a computer processing device ("CPU") configured to instruct one or more quantum processing units ("QPUs") to perform one or more operations associated with a quantum algorithm. In some embodiments, each of the one or more QPUs may include a plurality of qubits and the one or more QPUs may be in communication with each other via a quantum channel. In some embodiments, each of the plurality of qubits may include local qubits, global qubits, and/or synchronization qubits. In some embodiments, the local qubits of each QPU may be configured to perform the one or more operations associated with the quantum algorithm on the QPU that the local qubits are associated with. In some embodiments, the global qubits of each QPU may be configured to perform the one or more operations associated with the quantum algorithm in conjunction with the global qubits of other QPUs in the distributed quantum computing system.

After the QPUs receive the instruction from the CPU, the local qubits and/or the global qubits of each of the QPUs begin to continuously perform the one or more operations associated with the quantum algorithm. As the local qubits and/or the global qubits of each of the QPUs perform the one or more operations associated with the quantum algorithm, the synchronization qubits of each of the QPUs are transmitted between the QPUs to determine if the one or more operations associated with the quantum algorithm performed by each QPU are in sync. If the synchronization qubits of each of the QPUs indicate that the one or more operations associated with the quantum algorithm performed by each QPU are in sync, the one or more QPUs are instructed to terminate the continuous performance of the one or more operations associated with the quantum algorithm and the data generated by the distributed quantum computing system is stored. By way of a particular example, if the one or more operations associated with the quantum algorithm are in sync, the one or more QPUs terminate the continuous performance of the one or more operations associated with the quantum algorithm after the one or more QPUs have completed the one or more operations associated with the quantum algorithm (e.g., the one or more operations are not terminated during the middle of performing the one or more operations). If the synchronization qubits of each of the QPUs indicate that the one or more operations associated with the quantum algorithm performed by each QPU are not in sync, the QPUs are not instructed to terminate the continuous performance of the one or more operations associated with the quantum algorithm and the data generated by the one or more operations associated with the quantum algorithm performed by the one or more QPUs 102 is discarded. Said differently, the embodiments of the present disclosure provide QPUs that include dedicated or otherwise independent qubits devoted to synchronization operations such that iterative performance of the one or more operations of a quantum algorithm may (1) terminate when the QPUs are determined to be in sync or (2) continue their respective operations when the QPUs are not in sync.

By each QPU of the distributed quantum computing system continuously performing the one or more operations associated with the quantum algorithm until the one or more operations performed by each QPU are in sync, the distributed quantum computing embodiments disclosed herein provides improved quantum resource utilization. In this regard, each QPU is enabled to continuously perform the one or more operations associated with the quantum algorithm, rather than the QPUs operating in a conventional (e.g., scheduled sequential or component based approaches) systems in which some QPUs may remain idle. Additionally, since synchronization of the one or more operations associated with the quantum algorithm and communication between the QPUs is determined at the qubit level via a quantum channel, the distributed quantum computing system disclosed herein avoids latency introduced when transitioning between quantum communication and classical communication. Moreover, the introduction of both local and global qubits in each QPU enables the distributed quantum computing system disclosed herein to perform a quantum algorithm operation on both an individual QPU (e.g., for performing a component of a quantum algorithm that has been broken down into multiple components by a classical computer in parallel with other QPUs or for performing an operation that only requires a few qubits) and across multiple QPUs (e.g., for an operation that requires more qubits than a single QPU may provide).

Embodiments of the present disclosure now will be described more fully hereinafter with reference to the accompanying drawings in which some but not all embodiments are shown. Indeed, the present disclosure may be embodied in many different forms and should not be construed as limited to the embodiments set forth herein; rather, these embodiments are provided so that this disclosure will satisfy applicable legal requirements. Like numbers refer to like elements throughout. Furthermore, as would be evident to one of ordinary skill in the art in light of the present disclosure, the terms "substantially" and "approximately" indicate that the referenced element or associated description is accurate to within applicable engineering tolerances.

Distributed Quantum Computing System

Embodiments herein provide for an example distributed quantum computing system 100 for solving a quantum algorithm. In some embodiments, as shown in FIG. 1, the distributed quantum computing system 100 may include one or more quantum processing units (QPUs) 102 each configured to perform one or more operations associated with a quantum algorithm. As shown, the QPUs 102 may include a first QPU 102-1, a second QPU-2, a third QPU-3, . . . , a $N^{th}$ QPU 102-N. Although described hereinafter with reference to a defined number of QPUs 102, the present disclosure contemplates that any number of QPUs 102 may be used based upon the intended application of the distributed quantum computing system 100. In some embodiments, the one or more QPUs 102 may be in communication via a quantum channel 104 configured to transmit quantum information (e.g., qubits) and/or classical information (e.g., binary bits) between the one or more QPUs 102. Although illustrated and described herein with reference to a single quantum channel 104, the present disclosure contemplates that the distributed quantum computing system 100 may include any number of interconnected or distinct quantum channels 104 based upon the intended application of the distributed quantum computing system 100.

In some embodiments, some or all of the one or more QPUs 102 may be embodied on a single device. In other embodiments, some or all of the one or more QPUs 102 may be separate devices that are physically separated (e.g., remotely connected via the quantum channel 104). In some embodiments, the distributed quantum computing system 100 may include a computer processing device ("CPU") 108 (e.g., a classical computer) in communication with the one or more QPUs 102 via a classical interconnect 106 (e.g., a computer bus). In some embodiments, the CPU 108 may be physically separate from the one or more QPUs 102 and configured to remotely connect to the one or more QPUs 102 via the classical interconnect 106. In some embodiments, the CPU 108 may be configured to interface the distributed quantum computing system 100 with other classical and/or quantum computers. For example, the distributed quantum computing system 100 may be a portion of a high performance computing network.

In some embodiments, the CPU 108 may be configured to instruct the one or more QPUs 102 to perform one or more operations associated with a quantum algorithm via the classical interconnect 106. For example, in some embodiments, a user or operator associated with the distributed quantum computing system 100 may connect to the distributed quantum computing system 100 via the CPU 108 and may use the CPU 108 to perform the quantum algorithm on the distributed quantum computing system 100. In some embodiments, the distributed quantum computing system 100 may be configured to perform multiple quantum algorithms concurrently. In this regard, for example, the distributed quantum computing system 100 may be configured such that a portion of the one or more QPUs 102 may perform one quantum algorithm, while another portion on the one or more QPUs 102 may perform a different quantum algorithm. In some embodiments, the CPU 108 may be configured to receive the solution to the quantum algorithm from the one or more QPUs 102 once completed. In some embodiments, the CPU 108 may be configured to provide the solution to the quantum algorithm to the user or operator associated with the distributed quantum computing system 100 and/or to other classical and/or quantum computers connected to the distributed quantum computing system 100.

Figure 2:
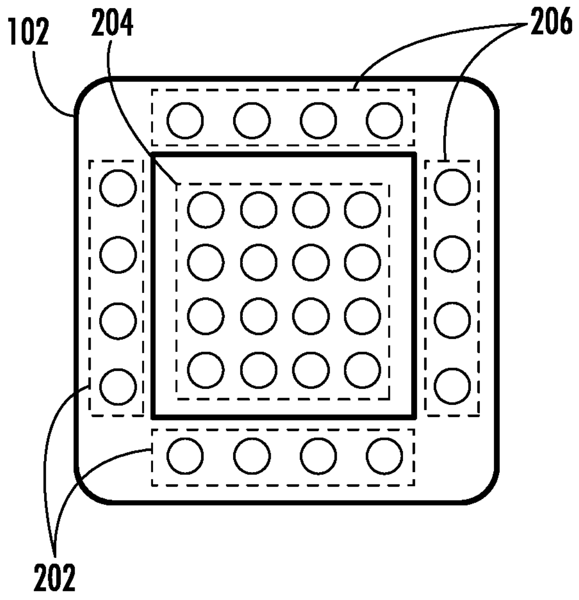
FIG. 2 illustrates an example quantum processing unit (QPU) in accordance with one or more embodiments of the present disclosure.

With reference to FIG. 2, the distributed quantum computing system 100 may include one or more QPUs 102 configured to perform one or more operations associated with a quantum algorithm. In some embodiments, the one or more QPUs 102 may be in communication with each other via the quantum channel 104. In some embodiments, the one or more QPUs 102 may each include a plurality of qubits. The plurality of qubits on each of the one or more QPUs 102 may include synchronization qubits 202, local qubits 204, and/or global qubits 206. As described hereinafter, the embodiments of the present disclosure may perform the synchronization operations described herein by leveraging the synchronization qubits 202 that define distinct or otherwise independent qubits with a sole function of determining if the operation of a quantum algorithm in a distributed quantum computing system 100 is in sync. Said differently, the QPUs 102 of the present disclosure are distinct from conventional systems or devices in that at least a portion of the qubits of each QPU 102 in the distributed quantum computing system 100 includes qubits (e.g., synchronization qubits 202) that are independent of the performance of the operations associated with the quantum algorithm (e.g., such as local qubits 204 and/or global qubits 206).

In some embodiments, the local qubits 204 of each of the one or more QPUs 102 may be configured to perform the one or more operations associated with the quantum algorithm on each of the one or more QPUs 102 as described. In other words, the local qubits 204 may be configured for performing operations associated with the quantum algorithm locally on a particular QPU 102. For example, the local qubits of an example first QPU 102-1 may be configured to perform the one or more operations of the quantum algorithm locally on the first QPU 102-1. In some embodiments, the global qubits 206 of each of the one or more QPUs 102 may be configured to perform the one or more operations associated with the quantum algorithm in conjunction with other global qubits of other QPUs 102. For example, a global qubit associated with a first QPU 102-1 may be configured to perform the one or more operations associated with the quantum algorithm in conjunction with a global qubit associated with a second QPU 102-2. In this way, if the one or more operations associated with the quantum algorithm require a greater number of qubits than may be provided by one of the one or more QPUs 102 alone, the distributed quantum computing system 100 may leverage the global qubits of multiple QPUs 102 to perform the one or more operations associated with the quantum algorithm. In some embodiments, the global qubits 206 may be entangled.

In some embodiments, the synchronization qubits 202 may be configured to determine if the one or more operations of one of the one or more QPUs 102 are in sync. In other words, the synchronization qubits 202 of each of the one or more QPUs 102 may be configured to determine if the one or more operations associated with the quantum algorithm performed by each of the one or more QPUs 102 are in sync. For example, a synchronization qubit of the first QPU 102-1 and a synchronization qubit of the second QPU 102-2 may be configured to determine if the one or more operations associated with the quantum algorithm performed by the first QPU 102-1 and the second QPU 102-2 are in sync as described more fully hereinafter with reference to FIGS. 5-6. In some embodiments, once the one or more QPUs 102 receive an instruction from the CPU 108 to perform the one or more operations associated with the quantum algorithm, the local qubits 204 and/or the global qubits 206 of each of the one or more QPUs 102 may commence continuous performance of the one or more operations associated with the quantum algorithm. As the local qubits 204 and/or global qubits 206 of each of the QPUs 102 perform the one or more operations associated with the quantum algorithm, the synchronization qubits 202 of each of the one or more QPUs 102 may be transmitted between the one or more QPUs 102 and configured to determine if the one or more operations of the quantum algorithm are in sync. In order to determine if the one or more operations of the quantum algorithm are in sync, the distributed quantum computing system 100 may implement a variety of quantum synchronization techniques. For example, the distributed quantum computing system 100 may implement a ticking qubit handshake synchronization technique to determine if the one or more operations performed by the one or more QPUs 102 are in sync. In some embodiments, the synchronization qubits 202 may be entangled.

Figure 3:
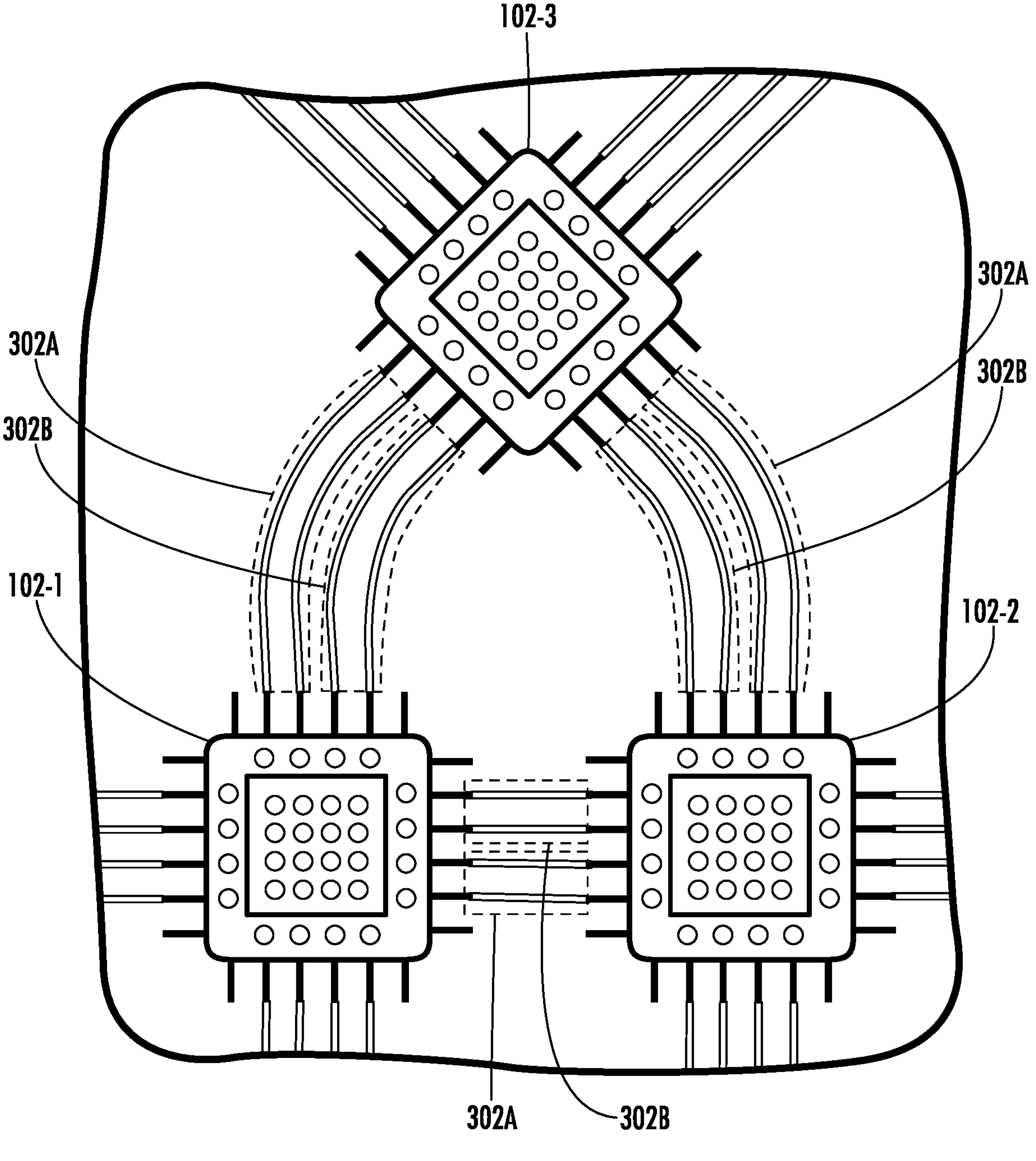
FIG. 3 illustrates a plurality of QPUs in communication via a quantum channel in accordance with one or more embodiments of the present disclosure.

The QPU 102 in FIG. 2 is illustrated with global qubits 206 grouped along a top and side portion (e.g., right side) of the QPU 102 and synchronization qubits 202 grouped along a bottom portion and another side portion (e.g., left side) of the QPU 102. The particular location of these qubits, however, with respect to the QPU 102 may be varied based upon the particular implementation of the embodiments described herein. By way of a particular example as shown in FIG. 3 described hereafter, each side (e.g., right, left, top, and bottom) of the QPU 102 may include a pair of synchronization qubits 202 and a pair of global cubits 206. In other words, the present disclosure contemplates that the number, orientation, relative position, etc. of the synchronization qubits 202 and/or the global qubits 206 for each QPU 102 may vary based upon the intended connection between QPUs 102 in the distributed quantum computing system 100. As such, FIG. 2 and FIG. 3 provide non-limiting examples of potential positioning of the synchronization qubits 202 and the global qubits 206 within QPUs 102.

If the synchronization qubits 202 of each of the QPUs 102 indicate that the one or more operations associated with the quantum algorithm performed by each QPU 102 are in sync, the one or more QPUs 102 may be instructed to terminate the continuous performance of the one or more operations associated with the quantum algorithm, and the data generated by the one or more QPUs 102 is stored. In other words, the termination of the operations described herein associated with the quantum algorithm may halt iterative operation in response to the determination that these operations are in sync based upon the implementation of synchronization qubits. In some embodiments, if the one or more operations associated with the quantum algorithm are in sync, the one or more QPUs terminate the continuous performance of the one or more operations associated with the quantum algorithm after the one or more QPUs have completed the one or more operations associated with the quantum algorithm (e.g., the one or more operations are not terminated during the middle of performing the one or more operations). In some embodiments, the data generated by the one or more QPUs 102 may be transmitted to the CPU 108. If the synchronization qubits 202 of each of the QPUs 102 indicate that the one or more operations associated with the quantum algorithm performed by each QPU 102 are not in sync, the one or more QPUs 102 are not instructed to terminate the continuous performance of the one or more operations associated with the quantum algorithm. In this regard, the one or more QPUs 102 continue to perform the one or more operations associated with the quantum algorithm.

As described above and shown in FIG. 3, the one or more QPUs 102 of the distributed quantum computing system 100 may be in communication via the quantum channel 104. In some embodiments, the quantum channel 104 may be substantially noiseless (e.g., because the quantum channel does not interact with a classical interconnect or a classical computer). Additionally, as described above the synchronization qubits 202 and the global qubits 206 may be configured to be transmitted between each of the one or more QPUs via the quantum channel 104. In some embodiments, the quantum channel 104 may be embodied by a plurality of fiber optic cables, such as 302A and 302B. In this regard, for example, the plurality of fiber optic cables may be configured to transmit the synchronization qubits 202 and/or the global qubits 206 as flying qubits (e.g., photon qubits). In some embodiments, the synchronization qubits 202 may be transmitted between the one or more QPUs 102 by a first set of fiber optic cables 302A of the plurality of fiber optic cables and the global qubits 206 may be transmitted between the one or more QPUs 102 by a second set of fiber optic cables 302B of the plurality of fiber optic cables.

Example Computer Processing Device (CPU)

Figure 4:
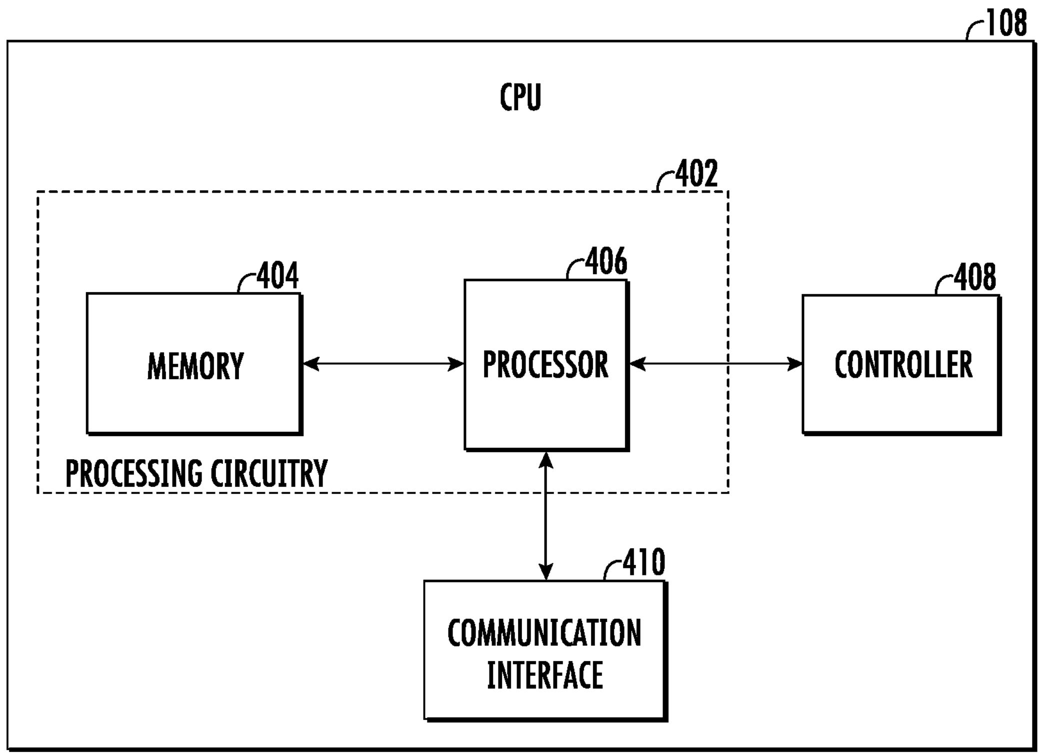
FIG. 4 illustrates a block diagram of an example computer processing device (CPU) in accordance with one or more embodiments of the present disclosure.

With reference to FIG. 4, a block diagram of the CPU 108 is illustrated in accordance with some example embodiments. However, it should be noted that the components, devices or elements illustrated in and described with respect to FIG. 4 below may not be mandatory and thus one or more may be omitted in certain embodiments. Additionally, some embodiments may include further or different components, devices or elements beyond those illustrated in and described with respect to FIG. 4.

The CPU 108 may include or otherwise be in communication with processing circuitry 402 that is configurable to perform actions in accordance with one or more example embodiments disclosed herein. In this regard, the processing circuitry 402 may be configured to perform and/or control performance of one or more functionalities of the CPU 108 in accordance with various example embodiments, and thus may provide means for performing functionalities of the CPU 108 in accordance with various example embodiments. The processing circuitry 402 may be configured to perform data processing, application execution and/or other processing and management services according to one or more example embodiments. In some embodiments, the CPU 108 or a portion(s) or component(s) thereof, such as the processing circuitry 402, may be embodied as or comprise a chip or chip set. In other words, the CPU 108 or the processing circuitry 402 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The CPU 108 or the processing circuitry 402 may therefore, in some cases, be configured to implement an embodiment of the disclosure on a single chip or as a single "system on a chip." As such, in some cases, a chip or chipset may constitute means for performing one or more operations for providing the functionalities described herein.

In some example embodiments, the processing circuitry 402 may include a processor 406 and, in some embodiments, such as that illustrated in FIG. 4, may further include memory 404. The processing circuitry 402 may be in communication with or otherwise control a communication interface 410 and/or a controller 408. As such, the processing circuitry 402 may be embodied as a circuit chip (e.g., an integrated circuit chip) configured (e.g., with hardware, software or a combination of hardware and software) to perform operations described herein.

The processor 406 may be embodied in a number of different ways. For example, the processor 406 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. Although illustrated as a single processor, it will be appreciated that the processor 406 may comprise a plurality of processors. The plurality of processors may be in operative communication with each other and may be collectively configured to perform one or more functionalities of the CPU 108 as described herein. The plurality of processors may be embodied on a single computing device or distributed across a plurality of computing devices collectively configured to function as the CPU 108. In some example embodiments, the processor 406 may be configured to execute instructions stored in the memory 404 or otherwise accessible to the processor 406. As such, whether configured by hardware or by a combination of hardware and software, the processor 406 may represent an entity (e.g., physically embodied in circuitry—in the form of processing circuitry 402) capable of performing operations according to embodiments of the present invention while configured accordingly. Thus, for example, when the processor 406 is embodied as an ASIC, FPGA or the like, the processor 406 may be specifically configured hardware for conducting the operations described herein. Alternatively, as another example, when the processor 406 is embodied as an executor of software instructions, the instructions may specifically configure the processor 406 to perform one or more operations described herein.

In some example embodiments, the memory 404 may include one or more non-transitory memory devices such as, for example, volatile and/or non-volatile memory that may be either fixed or removable. In this regard, the memory 404 may comprise a non-transitory computer-readable storage medium. It will be appreciated that while the memory 404 is illustrated as a single memory, the memory 404 may comprise a plurality of memories. The plurality of memories may be embodied on a single computing device or may be distributed across a plurality of computing devices collectively configured to function as the CPU 108. The memory 404 may be configured to store information, data, applications, instructions and/or the like for enabling the CPU 108 to carry out various functions in accordance with one or more example embodiments. For example, the memory 404 may be configured to buffer input data for processing by the processor 406. Additionally or alternatively, the memory 404 may be configured to store instructions for execution by the processor 406. As yet another alternative, the memory 404 may include one or more databases that may store a variety of files, contents or data sets. Among the contents of the memory 404, applications may be stored for execution by the processor 406 in order to carry out the functionality associated with each respective application. In some cases, the memory 404 may be in communication with one or more of the processor 406, communication interface 410, or the controller 408 via a bus(es) for passing information among components of the CPU 108.

In some example embodiments, the CPU 108 may further include a communication interface 410. In some cases, the communication interface 410 may be any means such as a device or circuitry embodied in either hardware, or a combination of hardware and software that is configured to receive and/or transmit data from/to a network and/or any other device or circuitry in communication with the processing circuitry 402. By way of example, the communication interface 410 may be configured to enable the CPU 108 to communicate with the one or more QPUs 102 and/or other quantum or classical computing devices. In this regard, for example, the communication interface 410 may be configured to be an analog to quantum communication bridge configured to covert physical layer digital signal representations from and/or to qubit states. The communication interface 410 may, for example, include an antenna (or multiple antennas) and supporting hardware and/or software for enabling communications with a wireless communication network (e.g., a wireless local area network, cellular network, and/or the like) and/or a communication modem or other hardware/software for supporting communication via cable, digital subscriber line (DSL), universal serial bus (USB), Ethernet or other methods.

In some example embodiments, the CPU 108 may include or otherwise control a controller 408. As such, the controller 408 may be embodied as various means, such as circuitry, hardware, a computer program product comprising computer readable program instructions stored on a computer readable medium (for example, the memory 404) and executed by a processing device (for example, the processor 406), or some combination thereof. The controller 408 may be capable of communication with one or more of the memory 404 or communication interface 410 to access, receive, and/or send data as may be needed to perform one or more of the functionalities of the controller 408 as described herein.

Example Method for Determining Time Synchronization Between QPUs

Figure 5:
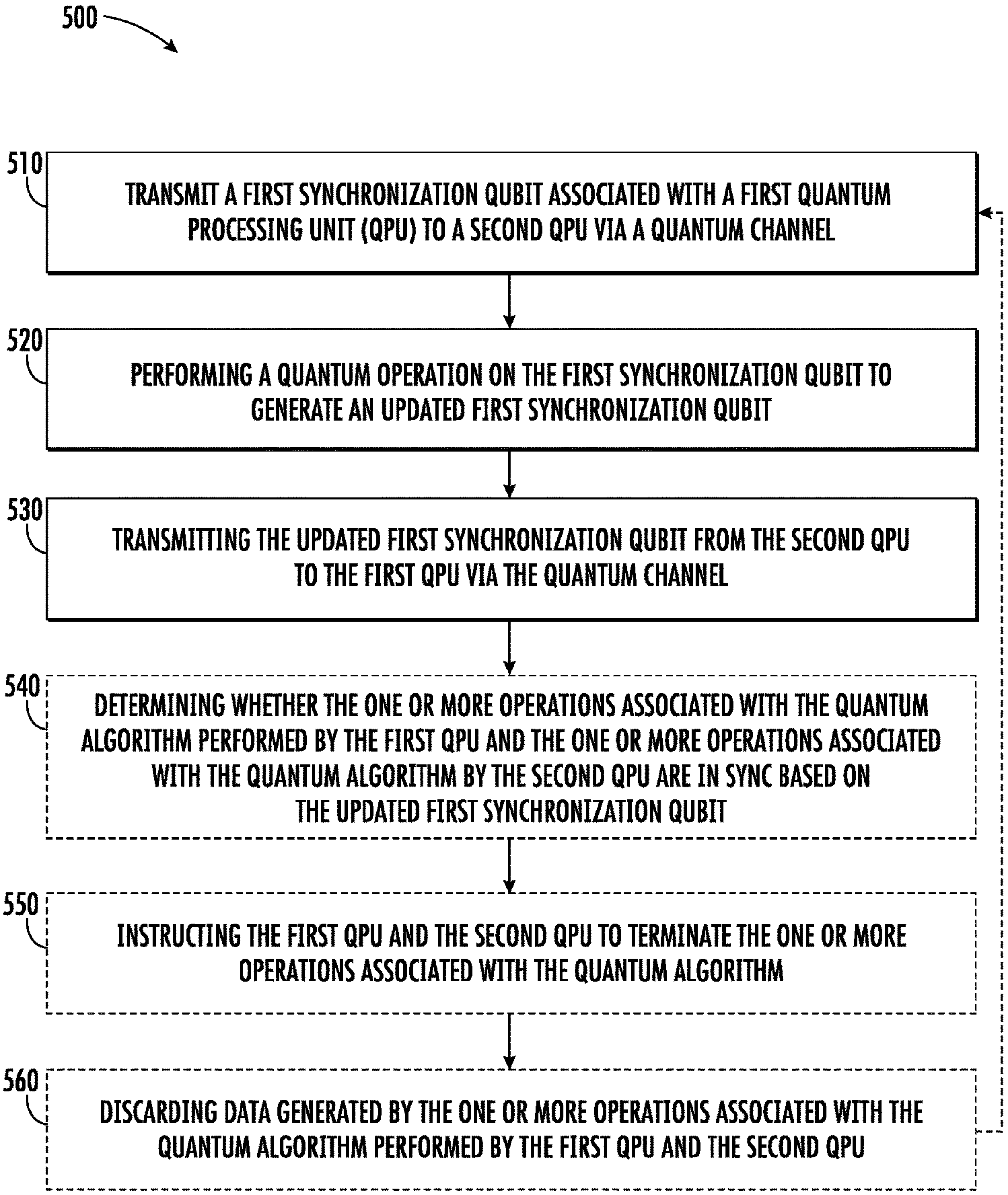
FIG. 5 illustrates a flowchart of an example method for determining time synchronization between QPUs in accordance with one or more embodiments of the present disclosure.

Referring now to FIG. 5, a flowchart providing an example method for determining time synchronization between QPUs is illustrated. In this regard, FIG. 5 illustrates operations that may be performed by the one or more QPUs 102. In some embodiments, the operations illustrated in FIG. 5 may, for example, be performed by, with the assistance of, and/or under the control of one or more apparatuses (e.g., the one or more QPUs 102), as described above. In this regard, performance of the operations may invoke one or more of synchronization qubits 202, local qubits 204, and/or global qubits 206.

As shown in block 510, the method may include transmitting a first synchronization qubit associated with a first quantum processing unit (QPU) to a second QPU via a quantum channel. As described above, the first QPU and the second QPU may be configured to perform one or more operations associated with a quantum algorithm, such as in response to a transmission or instruction from the CPU 108. For example, the first QPU 102-1 may transmit a first synchronization qubit 204 associated with the first QPU 102-1 to the second QPU 102-2 via the quantum channel 108. In some embodiments, the transmission of the first synchronization qubit 204 associated with the first QPU 102-1 to the second QPU 102-2 may occur in response to completion of the one or more operations performed by the first QPU 102-1 (e.g., via the local qubits 204 and/or the global qubits 206 of the first QPU 102-1). Although described herein with reference to performance of the operation illustrated at block 510 responsive to completion of the operations of the quantum algorithm, the present disclosure contemplates that the transmission at block 510 may occur in response to any instruction, indication, operation, etc. based upon the intended application of the distributed quantum computing system 100.

Thereafter, as shown in block 520, the method may include performing a quantum operation on the first synchronization qubit to generate an updated first synchronization qubit. For example, the second QPU 102-2 may perform an operation (e.g., $$\left(\text{e.g., } Xe^{-i\omega(t_2^b - t_1^a)Z},\right.$$

where $$t_1^a$$

is the time the first QPU 102-1 sends the first synchronization qubit 204 to the second QPU 102-2 and $$t_2^b$$

is the time the second QPU 102-2 receives the first synchronization qubit 204) in accordance with the ticking qubit handshake synchronization technique on the first synchronization qubit 204 associated with the first QPU 102-1.

As shown in block 530, the method may include transmitting the updated first synchronization qubit from the second QPU to the first QPU via the quantum channel. For example, the second QPU 102-2 may transmit the updated first synchronization qubit 204 associated with the first QPU 102-1 to the first QPU 102-1 such as described above with reference to block 510.

As shown in block 540, the method may include determining whether the one or more operations associated with the quantum algorithm performed by the first QPU and the one or more operations associated with the quantum algorithm by the second QPU are in sync based on the updated first synchronization qubit. For example, the first QPU 102-1 may determine if the one or more operations performed by the first QPU 102-1 and the second QPU 102-2 are in sync.

As shown in optional block 550, in an instance in which the one or more operations associated with the quantum algorithm performed on the first QPU and the one or more operations associated with the quantum algorithm performed on the second QPU are in sync, the method may include instructing the first QPU and the second QPU to terminate the one or more operations associated with the quantum algorithm. For example, the first QPU 102-1 and the second QPU 102-2 may stop performing the one or more operations associated with the quantum algorithm. Said differently, in instances in which the first QPU 102-1 and the second QPU 102-2 are in sync, further operations by the first QPU 102-1 and/or the second QPU 102-2 with regard to the particular quantum algorithm supplied to the QPUs 102 may be unnecessary (e.g., a complete final solution is determined).

As shown in optional block 560, in an instance in which the one or more operations associated with the quantum algorithm performed on the first QPU and the one or more operations associated with the quantum algorithm performed on the second QPU are not in sync, the method may include discarding data generated by the one or more operations associated with the quantum algorithm performed by the first QPU and the second QPU. For example, the data generated by the first QPU 102-1 and the second QPU 102-2 performing the one or more operations associated with the quantum algorithm may be discarded. Said differently, in instances in which the first QPU 102-1 and the second QPU 102-2 are not in sync, further operations by the first QPU 102-1 and/or the second QPU 102-2 with regard to the particular quantum algorithm supplied to the QPUs 102 may be necessary (e.g., a complete for final solution is not determined).

Example Method for Performing Distributed Quantum Computing

Referring now to FIG. 6, a flowchart providing an example method for performing distributed quantum computing. In some embodiments, the operations illustrated in FIG. 6 may, for example, be performed by, with the assistance of, and/or under the control of a system (e.g., distributed quantum computing system 100), as described above. In this regard, performance of the operations may invoke one or more of processor 406, memory 404, controller 408, communication interface 410, synchronization qubits 202, local qubits 204, and global qubits 206.

As shown in block 610, the method may include transmitting a first instruction to perform one or more operations associated with a quantum algorithm on a first quantum processing unit (QPU) and a second QPU. For example, the CPU 108 may transmit the first instruction to the first QPU 102-1 and the second QPU 102-2 to perform the one or more operations associated with the quantum algorithm. In some embodiments, the first QPU comprises synchronization qubits and the second QPU comprise synchronization qubits. In some embodiments, the synchronization qubits of the first QPU and the synchronization qubits of the second QPU are configured to determine if the one or more operations associated with the quantum algorithm performed by the first QPU and the second QPU are in sync.

As shown in block 620, the method may include transmitting the synchronization qubits of the first QPU to the second QPU via a quantum channel. For example, the first QPU 102-1 may transmit synchronization qubits 204 associated with the first QPU 102-1 to the second QPU 102-2 via the quantum channel 108. In some embodiments, the transmission of the synchronization qubits 204 associated with the first QPU 102-1 to the second QPU 102-2 may occur in response to completion of the one or more operations performed by the first QPU 102-1 (e.g., via the local qubits 204 and/or the global qubits 206 of the first QPU 102-1). Although described herein with reference to performance of the operation illustrated at block 620 responsive to completion of the operations of the quantum algorithm, the present disclosure contemplates that the transmission at block 620 may occur in response to any instruction, indication, operation, etc. based upon the intended application of the distributed quantum computing system 100.

As shown in block 630, the method may include preforming a quantum operation on the synchronization qubits of the first QPU to generate updated synchronization qubits of the first QPU. For example, the second QPU 102-2 may perform an operation in accordance with the ticking qubit handshake synchronization technique on the synchronization qubits 204 associated with the first QPU 102-1.

As shown in block 640, the method may include transmitting the updated synchronization qubits of the first QPU from the second QPU to the first QPU via the quantum channel. For example, the second QPU 102-2 may transmit the updated synchronization qubits 204 associated with the first QPU 102-1 to the first QPU 102-1 such as described above with reference to block 620.

As shown in block 650, the method may include determining whether the one or more operations associated with the quantum algorithm performed by the first QPU and the one or more operations associated with the quantum algorithm performed by the second QPU are in sync based on the updated synchronization qubits of the first QPU. For example, the first QPU 102-1 may determine if the one or more operations performed by the first QPU 102-1 and the second QPU 102-2 are in sync.

As shown in optional block 660, the method may include receiving data generated by the one or more operations associated with the quantum algorithm performed by the first QPU and the second QPU. For example, the CPU 108 may receive data generated by the one or more operations associated with the quantum algorithm from the first QPU 102-1 and the second QPU 102-2.

Many modifications and other embodiments of the inventions set forth herein will come to mind to one skilled in the art to which these inventions pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An apparatus comprising:

a first quantum processing unit (QPU) configured to continuously perform one or more operations associated with a quantum algorithm, wherein the first QPU comprises a first plurality of qubits, and wherein at least a portion of the first plurality of qubits are synchronization qubits, wherein the apparatus is configured to determine if the one or more operations continuously performed by the first QPU are in sync with operations continuously performed by one or more other QPUs coupled with the first QPU, wherein, responsive to a determination associated with synchronization of the first QPU, the apparatus is configured to selectively store or discard data generated by the continuous performance of the one or more operations associated with the quantum algorithm.

2. The apparatus of claim 1, wherein at least a portion of the first plurality of qubits are local qubits configured to perform the one or more operations associated with the quantum algorithm on the first QPU.

3. The apparatus of claim 2, wherein the synchronization qubits are independent of the local qubits performing the one or more operations associated with the quantum algorithm.

4. The apparatus of claim 1, further comprising:

a second QPU in communication with the first QPU via a quantum channel and configured to perform the one or more operations associated with the quantum algorithm, wherein the second QPU comprises a second plurality of qubits, and wherein at least a portion of the second plurality of qubits are synchronization qubits configured to determine if the one or more operations performed by the second QPU associated with the quantum algorithm are in sync.

5. The apparatus of claim 4, wherein the synchronization qubits of the first QPU and the synchronization qubits of the second QPU are further configured to determine if the one or more operations associated with the quantum algorithm performed by the first QPU and the second QPU are in sync.

6. The apparatus of claim 5, wherein determining if the one or more operations associated with the quantum algorithm are in sync comprises:

transmitting the synchronization qubits of the first QPU to the second QPU via a quantum channel;

performing a quantum operation on the synchronization qubits of the first QPU to generate updated synchronization qubits of the first QPU;

transmitting the updated synchronization qubits of the first QPU from the second QPU to the first QPU via the quantum channel; and determining whether the one or more operations associated with the quantum algorithm performed by the first QPU and the one or more operations associated with the quantum algorithm performed by the second QPU are in sync based on the updated synchronization qubits of the first QPU.

7. The apparatus of claim 5, wherein the first QPU and the second QPU operate in parallel to perform the one or more operations associated with the quantum algorithm.

8. The apparatus of claim 7, wherein at least a portion of the first plurality of qubits of the first QPU comprise global qubits and wherein at least a portion of the second plurality of qubits of the second QPU comprise global qubits, wherein the global qubits of the first QPU are configured to perform the one or more operations associated with the quantum algorithm in conjunction with the global qubits of the second QPU.

9. The apparatus of claim 8, wherein the global qubits of the first QPU and the global qubits of the second QPU are entangled.

10. The apparatus of claim 4, further comprising a computer processing device in communication with the first QPU and the second QPU, wherein the computer processing device is configured to receive data generated by the one or more operations associated with the quantum algorithm performed by the first QPU and the second QPU.

11. The apparatus of claim 1, wherein determining that the one or more operations continuously performed by the first QPU associated with the quantum algorithm are in sync is based at least in part on a handshake-based quantum operation on the synchronization qubits of the first QPU.

12. The apparatus of claim 1, wherein determining that the one or more operations continuously performed by the first QPU associated with the quantum algorithm are in sync is based on a measurement of the synchronization qubits of the first QPU.

13. The apparatus of claim 12, wherein the measurement comprises at least a measurement of the phase of the synchronization qubits.

14. A method comprising:

transmitting a first synchronization qubit associated with a first quantum processing unit (QPU) to a second QPU via a quantum channel, wherein the first QPU and the second QPU are configured to perform one or more operations associated with a quantum algorithm;

performing a handshake-based quantum operation on the first synchronization qubit to generate an updated first synchronization qubit;

transmitting the updated first synchronization qubit from the second QPU to the first QPU via the quantum channel; and determining whether the one or more operations associated with the quantum algorithm performed by the first QPU and the one or more operations associated with the quantum algorithm performed by the second QPU are in sync based on the updated first synchronization qubit.

15. The method of claim 14, in an instance in which the one or more operations associated with the quantum algorithm performed on the first QPU and the one or more operations associated with the quantum algorithm performed on the second QPU are in sync, further comprising:

instructing the first QPU and the second QPU to terminate the one or more operations associated with the quantum algorithm.

16. The method of claim 14, in an instance in which the one or more operations associated with the quantum algorithm performed on the first QPU and the one or more operations associated with the quantum algorithm performed on the second QPU are not in sync, further comprising:

discarding data generated by the one or more operations associated with the quantum algorithm performed by the first QPU and the second QPU.

17. The method of claim 14, wherein the first QPU further comprises local qubits and global qubits, wherein the second QPU further comprises local qubits and global qubits.

18. The method of claim 17, wherein local qubits of the first QPU are configured to perform the one or more operations associated with the quantum algorithm on the first QPU, wherein the local qubits of the second QPU are configured to perform the one or more operations associated with the quantum algorithm on the second QPU.

19. The method of claim 18, wherein the first synchronization qubit and the second synchronization qubit are independent of the local qubits of the first QPU and the local qubits of the second QPU performing the quantum algorithm.

20. The method of claim 17, wherein the global qubits of the first QPU are configured to perform the one or more operations associated with the quantum algorithm in conjunction with the global qubits of the second QPU.

21. The method of claim 17, wherein the global qubits of the first QPU and the global qubits of the second QPU are entangled.

22. A method comprising:

transmitting a first instruction to perform one or more operations associated with a quantum algorithm on a first quantum processing unit (QPU) and a second QPU, wherein the first QPU comprises synchronization qubits and the second QPU comprises synchronization qubits, wherein the synchronization qubits of the first QPU and the synchronization qubits of the second QPU are configured to determine if the one or more operations associated with the quantum algorithm performed by the first QPU and the second QPU are in sync, wherein determining if the one or more operations associated with the quantum algorithm are in sync comprises:

transmitting the synchronization qubits of the first QPU to the second QPU via a quantum channel;

performing a handshake-based quantum operation on the synchronization qubits of the first QPU to generate updated synchronization qubits of the first QPU;

transmitting the updated synchronization qubits of the first QPU from the second QPU to the first QPU via the quantum channel; and determining whether the one or more operations associated with the quantum algorithm performed by the first QPU and the one or more operations associated with the quantum algorithm performed by the second QPU are in sync based on the updated synchronization qubits of the first QPU.

23. The method of claim 22, wherein in an instance in which the one or more operations associated with the quantum algorithm performed on the first QPU and the one or more operations associated with the quantum algorithm performed on the second QPU are in sync:

receiving data generated by the one or more operations associated with the quantum algorithm performed by the first QPU and the second QPU.

24. The method of claim 22, wherein the first QPU further comprises local qubits and global qubits, wherein the second QPU further comprises local qubits and global qubits.

25. The method of claim 24, wherein the local qubits of the first QPU are configured to perform the one or more operations associated with the quantum algorithm on the first QPU, wherein the local qubits of the second QPU are configured to perform the one or more operations associated with the quantum algorithm on the second QPU.

26. The method of claim 25, wherein the synchronization qubits of the first QPU and the synchronization qubits of the second QPU are independent of the local qubits of the first QPU and the local qubits of the second QPU performing the quantum algorithm.

27. The method of claim 24, wherein the global qubits of the first QPU are configured to perform the one or more operations associated with the quantum algorithm in conjunction with the global qubits of the second QPU.

28. The method of claim 24, wherein the global qubits of the first QPU and the global qubits of the second QPU are entangled.

* * * * *